United States Patent [19]

Schlieter

[11] Patent Number: 4,792,714
[45] Date of Patent: Dec. 20, 1988

[54] COMMUTATOR WITH NON-UNIFORM BARS AND EQUALLY SPACED HOOKS

[75] Inventor: Donald C. Schlieter, Hilton, N.Y.
[73] Assignee: General Motors Corporation, Detroit, Mich.
[21] Appl. No.: 151,226
[22] Filed: Feb. 1, 1988
[51] Int. Cl.$^4$ ............................................. H02K 13/04
[52] U.S. Cl. ..................................... 310/234; 310/233; 310/51
[58] Field of Search .................. 310/51, 233, 234, 235, 310/236, 237

[56] References Cited

U.S. PATENT DOCUMENTS 4,399,383  8/1983  Kamiyama ........................... 310/233
4,433,263  2/1984  Longhouse ........................... 310/233

FOREIGN PATENT DOCUMENTS 616053  3/1961  Canada .................................. 310/237
284534  5/1915  Fed. Rep. of Germany ...... 310/236

Primary Examiner—Patrick R. Salce
Assistant Examiner—D. L. Rebsch
Attorney, Agent, or Firm—Robert M. Sigler

[57] ABSTRACT

A commutator is adapted for more consistent hot staking of the armature wire to the commutator hooks and easier armature winding with larger diameter wire by providing two commutator hooks on each of two diametrically opposed commutator bars and one hook on each of the others and spacing the commutator hooks circumferentially equally, so that there is a separate commutator hook for each armature wire needing commutator connection. The diametrically opposed commutator bars subtend the largest arcs to accommodate the two commutator hooks. The remainder of the commutator bars may subtend increasing arcs, progressing from one of the diametrically opposed bars to the other in opposite rotational directions, to spread the noise spectrum of brush noise during motor operation. Rotational orientation means for armature winding are provided in the form of indexing tabs projecting from the commutator bars having two hooks, in a direction axially opposite that of the hooks.

5 Claims, 1 Drawing Sheet

COMMUTATOR WITH NON-UNIFORM BARS AND EQUALLY SPACED HOOKS

BACKGROUND OF THE INVENTION

This invention relates to commutators for electric motors and especially for the provision of a commutator that provides more consistent hot staking of the armature wires to commutator hooks and facilitates easier armature winding with larger diameter wire.

A commutator generally comprises a circular array of electrically conducting commutator bars, spaced from and insulated from one another and provided with commutator hooks for the connection of armature windings in a predetermined winding pattern. In at least one such armature winding pattern using a double flier winder, two wires must be attached to each of two diametrically opposed commutator bars. The commutator bars are generally of equal size and shape so that they subtend equal circumferential arcs; and the hooks are also identical. The wires are permanently attached to the hooks in a hot staking operation in which the heat and pressure supplied must be controlled so that the copper deforms to collapse around the wire but does not melt. The hot staking operation is accomplished by apparatus which stakes all hooks with the same heat and pressure application parameters, but the commutator hooks with two wires require different heat and pressure application parameters for optimum hot staking than those having one wire. Therefore, the parameters of the hot staking process cannot be optimized for either but must be compromised on values that will work for both. In addition, motor designers often wish to use larger diameter wire for the armature windings. The larger diameter wire is more bulky; and two such wires together are not as easily retained on a commutator hook during the winding and hot staking process.

SUMMARY OF THE INVENTION

The commutator of this invention provides more consistent hot staking of all commutator hooks and easier retention of larger diameter wire on commutator hooks during armature winding and hot staking by providing two extra commutator hooks, one each on diametrically opposed commutator bars, so that each hook retains a single wire, and spacing the commutator hooks circumferentially equally. Consequently, the commutator bars themselves do not subtend equal circumferential arcs. The two diametrically opposed commutator bars with two commutator hooks must subtend the largest arcs, with the others subtending smaller arcs to accommodate the spacing of the commutator hooks. Also, since the commutator hooks themselves are evenly spaced, indexing means are provided to properly rotationally initialize the armature during winding. The indexing means may take the form of an axial tab projecting from the end of each of the diametrically opposed commutator bars in the opposite direction from that of the hooks.

In addition, one embodiment of the invention varies the circumferential arcs of the cmmmutator bars between the two diametrically opposed commutator bars in a particular arrangement to assist in quieting the operation of the motor in operation by spreading the frequencies of the noise of the brushes on the rotating commutator bars across a broader frequency spectrum. The particular arrangement is a progressively increasing subtended arc progressing from one to the other of the diametrically opposed commutator bars in opposite rotational directions.

Further details and advantages of the invention will be apparent from the accompanying drawings and following description of a preferred embodiment.

DESCRIPTION OF THE PREFERRED EMBODIMENT

Figure 1:
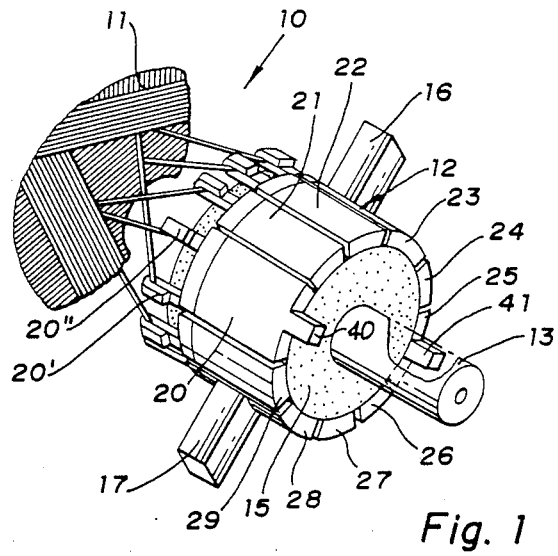
FIG. 1 is a perspective view of a motor armature including an embodiment of a commutator according to this invention.

Referring to FIG. 1, a motor armature 10 includes armature windings 11 and a rotating commutator assembly 12 on an armature shaft 13. Armature 10 is understood to be rotatably mounted on shaft 13 within a stator assembly in a DC motor, the stator being typically, but not necessarily, of the permanent magnet variety. A stationary brush assembly comprises two diametrically opposed brushes 16 and 17 which are biased into contact with the rotating commutator assembly 12.

Commutator 12 comprises a circular array of electrically conducting commutator bars 20-29 which, in this embodiment, are made of copper and arranged in a cylindrical manner for contact by radially directed brushes 16 and 17. In this embodiment, references to circumferential directions and subtended arcs refer to the circular path traced by stationary brushes on the radial outer surface of the bsrs as the bars 20-29 rotate about the axis of shaft 13. It should be noted, hoeever, that flat commutators are also known. In these commutators, the commutator bars are pie shaped sectors in a plane perpendicular to the axis of shaft 13, with axially directed brushes tracing a circular path on their faces as the armature rotates.

Figure 2:
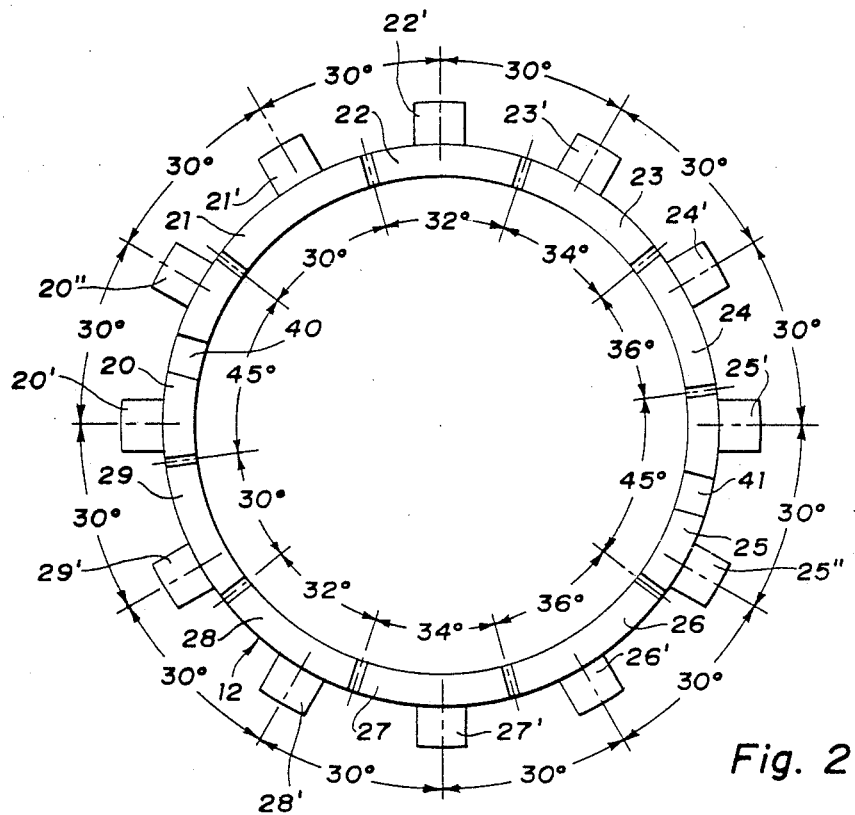
FIG. 2 is a schematic drawing showing the circumferential arrangement of commutator bars and hooks in the commutator embodiment of FIG. 1.

The commutator of this embodiment has ten bars 20-29 set in a molded member 15. Bars 20 and 25 are diametrically opposed and each subtends a circumferential arc of substantially 45 degrees, as seen in FIG. 2. The arc subtended is actually slightly less than this, since a small separating space is left between each adjacent commutator bar, but this is not important to this description. This comparatively large subtended circumferential arc is to make room for two commutator hooks on each of bars 20 and 25. Hooks 20' and 20" project from bar 20 toward armature winding 11 and bend back in the opposite axial direction to provide an open hook through which a wire from winding 11 passes. Likewise, commutator hooks 25' and 25" project from commutator bar 25. Commutator hooks 20' and 20" are spaced from each other by an angle of 30 degrees (from the center of one to the center of the other), as are commutator hooks 25' and 25".

Proceeding in the clockwise direction from commutator bar 20 to commutator bar 25, a first group of additional commutator bars 21 (subtending substantially 30 degrees), 22 (32 degrees), 23 (34 degrees) and 24 (36 degrees) subtend progressively larger arcs as indicated; and each has a single commutator hook referenced with the primed reference number corresponding to that of the bar itself. It can be seen that each commutator hook is spaced 30 degrees from that on either side. Likewise, proceeding in the counter clockwise direction from commutator bar 20 to commutator bar 25, a second group of additional commutator bars 29 (30 degrees), 28 (32 degrees), 27 (34 degrees) and 26 (36 degrees) subtend progressively larger arcs as indicated; and each has a commutator hook similarly numbered with a primed reference numeral. These hooks are also spaced by a common 30 degrees so that the total of twelve commutator hooks are equally spaced around the circumference of commutator 12. Actually, the centerlines of the spaces between the commutator bars are more accurately spaced by 30.75, 32.75, 34.75 and 36.75 degrees which, when added to 45 degrees and doubled, add up to an even 360 degrees of a circle. However, the bars are also separated by slight gaps for insulation, so the rounded numbers are actually fairly accurate. Naturally, if brush noise were not important, each of the other commutator bars between bars 20 and 25 could be given a constant arc of 33 degrees; and the hooks could still be equally spaced at 30 degrees. However, this would lead to the brush noise being concentrated to some extent at a frequency determined by the 33 degree spacing and the rotational speed of armature 10. It is desirable in some embodiments to vary the arcs to decrease the concentration of noise at this frequency by a spreading of the brush noise across the frequency spectrum; and 30 degrees is the smallest arc possible for a commutator bar when the commutator hooks are spaced by 30 degrees. It should finally be noted that the arcs of the commutator bars increase in both clockwise and counter clockwise directions from bar 20 rather than increasing in the same direction from each of bars 20 and 25.

Circumferential indexing means are provided on commutator 12 for the initial circumferential orientation of armature 10 during armature winding. In the armature winding process using a double flier winder, the first and last armature wires of the opposing coil series are attached to hooks on the same commutator bar. The commutator hooks, being equally circumferentially spaced, are indistinguishable and therefore do not provide such initial orientation. This embodiment provides an indexing tab 40 projecting axially out from commutator bar 20 in a direction away from armature winding 11 and an indexing tab 41 projecting similarly from commutator bar 25. Tabs 40 and 41 may be identical, since it is not necessary to distinguish between commutator bars 20 and 25. Tabs 40 and 41 project out axially away from the rest of the armature to be sensed by appropriate apparatus during the rotational orientation of armature 10 on the assembly line but do not interfere with the operation of the motor in which armature 10 is used. They are also easily formed in the single stamped copper sheet from which commutator 12 is manufactured before it is rolled into a cylindrical shape, held while molded member 15 is formed within and around it, and separated by cutting into the individual commutator bars in the standard commutator manufacturing operation.

The embodiments of the invention in which an exclusive property or privilege is claimed are defined as follows:

1. A commutator for an electric motor having an armature with a winding and a pair of diametrically opposed brushes contacting the commutator, the commutator comprising, in combination:

a first even number of commutator segments insulated from each other and arranged in a circular pattern, the commutator segments carrying a second even number, two greater than the first even number, of commutator hooks adapted for the attachment of the winding, the commutator hooks being circularly arranged and evenly spaced from each other in their circular arrangement, a diametrically opposing pair of the commutator segments each subtending an arc sufficient for and carrying two of the commutator hooks, and each commutator segment between the two diametrically opposed commutator segments subtending an arc smaller than the arcs subtended by the diametrically opposed pair of the commutator segments but sufficient for and carrying one of the commutator hooks; and circumferential indexing means formed in each of the diametrically opposed commutator segments, whereby the armature may be rotationally oriented with respect to the diametrically opposed commutator segments during armature winding.

2. The commutator of claim 1 in which the circumferential indexing means comprises an indexing tab projecting axially from each of the diametrically opposed commutator bars in the axial direction away from the commutator hooks and armature winding.

3. The commutator of claim 1 in which the commutator segments between the diametrically opposed commutator segments subtend successively increasing angles progressing from one of the diametrically opposed commutator segments to the other in opposite rotational directions, whereby the audible noise created as the commutator segments pass the brushes is distributed over a plurality of frequencies.

4. The commutator of claim 2 in which the commutator segments between the diametrically opposed commutator segments subtend successively increasing angles progressing from one of the diametrically opposed commutator segments to the other in opposite rotational directions, whereby the audible noise created as the commutator segments pass the brushes is distributed over a plurality of frequencies.

5. The commutator of claim 4 in which the number of commutator segments is 10, the number of commutator hooks is 12, the commutator hooks are circularly spaced on 30 degree centers, the diametrically opposed commutator segments each subtend an arc of substantially 45 degrees and the commutator segments between the diametrically opposed commutator segments, on each side of the armature, subtend arcs of substantially 30, 32, 34 and 36 degrees progressing from one of the diametrically opposed commutator hooks to the other.

* * * * *